Aug. 11, 1931.                P. FAVOUR                 1,817,977
                          MOTION PICTURE FILM
                        Filed March 1, 1928        2 Sheets-Sheet 1

Inventor,
Paul Favour,
R. L. Stinchfield
N. M. Perrins
By
Attorney

Aug. 11, 1931. P. FAVOUR 1,817,977
MOTION PICTURE FILM
Filed March 1, 1928   2 Sheets-Sheet 2
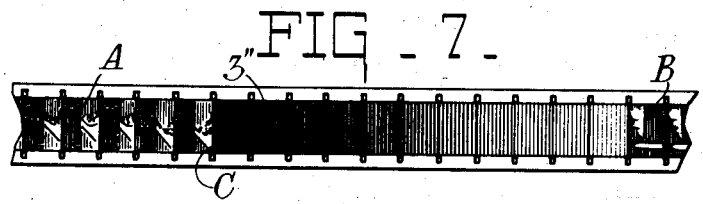
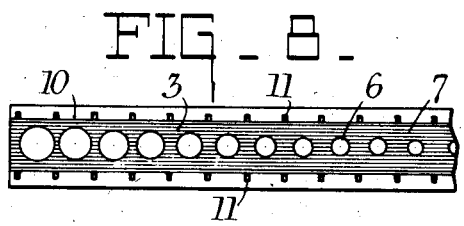
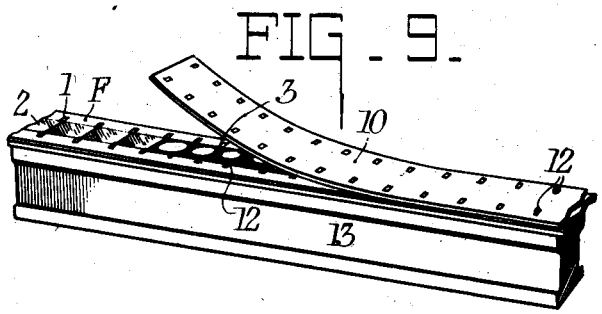
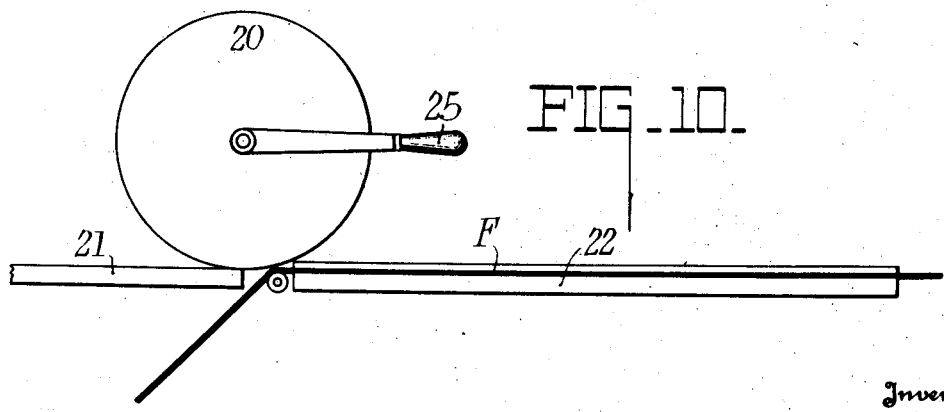

Patented Aug. 11, 1931

1,817,977

UNITED STATES PATENT OFFICE

PAUL FAVOUR, OF ROCHESTER, NEW YORK, ASSIGNOR TO EASTMAN KODAK COMPANY, OF ROCHESTER, NEW YORK, A CORPORATION OF NEW YORK

MOTION PICTURE FILM

Application filed March 1, 1928. Serial No. 258,289.

This invention relates to cinematography and more particularly to an article and method useful in giving "fade in" and "iris" effects in projecting consecutive scenes originally taken under uniform exposure conditions.

While of general application, my invention is of particular use in the editing and splicing of amateur motion picture films of small dimension, where there is usually only a single print and elaborate taking and printing methods are not warranted; and where the successive scenes are frequently of varying quality and subject matter.

When a reel of such film has been assembled it is possible, by my invention, to determine from the complete projected film at what points the features mentioned would be most desirable, and to apply to the film as an otherwise completed film, or photoplay, a layer overlapping the junction of successive scenes and varying in its density and in "iris" effect, so as to change the character of the transition from one scene to the next.

The overlapping layer may be applied by any known or desired method. While preferably it is of the transfer or decalcomania type, it may be applied by stenciling, by a printing process, by cementing a separate strip or other equivalent method.

Reference will now be made to the accompanying drawings wherein the same reference characters denote the same parts throughout, and in which Fig. 1 is a face view of a printed film as first assembled;

Figure 5:
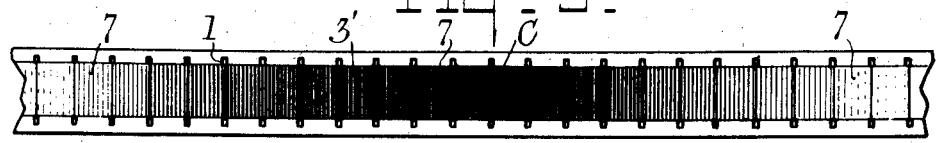
Figure 6:
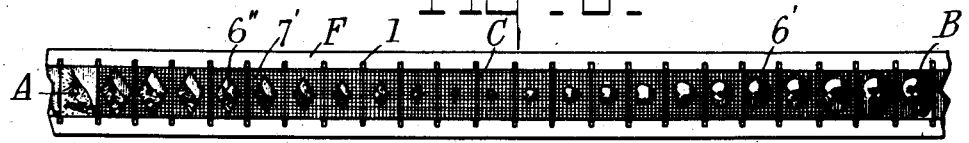

Figs. 5, 6, and 7 are face views of films embodying modifications of my invention;

Fig. 8 shows a strip carrying a transfer layer to be applied to a finished film;

Fig. 9 shows a layer being transferred from its carrier to the film;

Fig. 10 shows a layer being applied from a printing roll; and

Figure 11:
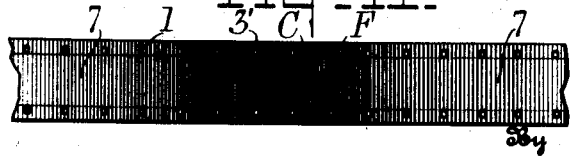

Fig. 11 is a face view of a film embodying another modification.

Figure 1:
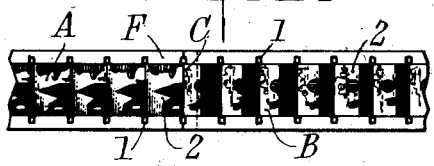

My invention is preferably applied to a complete and assembled strip of film containing consecutive series of images. Such a film F is shown in Fig. 1, and has the usual edge perforations 1, and in the form shown a picture area 2 for each pair of perforations. There are two series of picture or image areas, A and B, each series constituting a scene and the several frames of each series being of substantially uniform density and contrast. The two subjects may be, however, very different so that there is an abrupt change at their junction C which is not pleasing when projected.

Figure 2:
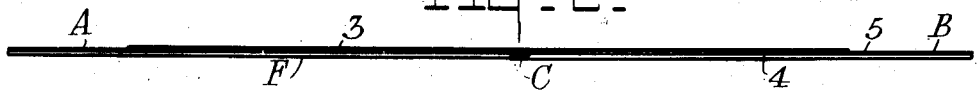
Figs. 2 and 3 are edge views of different forms of such a film, and embody my invention.
Figure 3:
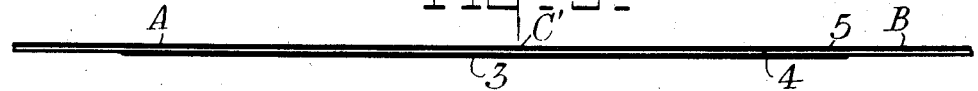

In such cases as this a gradual transition such as a "fade in" or "irising" is very desirable, and I obtain such an effect by applying a layer 3 preferably across the junction and extending over a continuous series of picture frames on each side of the junction. This layer is shown in edge view in Fig. 2, where the two series A and B are indicated as being on two pieces of film, the junction C being in the form of a splice. In the form shown in Fig. 3, the two picture series are on the same strip of film, the junction C' being merely indicated. In each case the film comprises a light transmitting support 4 of a composition including cellulose acetate, cellulose nitrate or other cellulosic compound, and a photographic emulsion layer 5 containing the images. The layer 3 may be applied either on the emulsion surface, as in Fig. 2, or on the support surface, as in Fig. 3.

Figure 4:
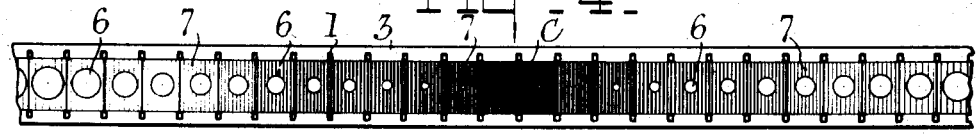
Fig. 4 is a face view of a film embodying the preferred form of my invention.

This applied layer is of varying light transmission from frame to frame, and in the preferred form, shown in Fig. 4, this consists of a series of transparent areas 6 of the same shape, here shown as circular, surrounded by light retarding borders 7 covering the rest of each picture area, the areas 6 being large at the ends of the applied strip and becoming gradually smaller toward the junction where they may entirely disappear, and the density of the border areas gradually grows greater toward the junction where it may be opaque. This gives, when projected, an iris out and in of the central part of the picture area and a fade out and in of the border portion.

In the embodiment of Fig. 5, the iris-out feature is omitted and the strip 3' varies in density only, being densest at its middle portion.

In the form shown in Fig. 6, the transparent areas 6' are heart shaped over one series and grow smaller toward the junction, and the areas 6" on the other scene are diamond shaped. The border portions 7' are of uniform density, being preferably opaque throughout.

In each of the forms it is to be noted that the total light transmission of successive picture frames varies uniformly and increases from the ends to the center of the applied layer. The layer may extend over the entire width of the film as in Fig. 11, or over the picture area only as in the other figures.

The layer may extend over the end portion of one series only as in Fig. 7, where the layer 3" increases in density toward the junction C and stops there.

The form of the applied layer may vary widely. Preferably there will be supplied, as articles of manufacture and sale, strips of a support 10 such as paper having on one surface an easily stripped layer 3. The paper strip may have perforations 11 corresponding to perforations 1 and constituting a means for centering the areas 6 with the picture frames. The paper strips are wider than the transfer strip, and will be laid upon the film strip with the perforations in registry. The paper strip with the transfer material will be submitted to such treatment as may be necessary to cause the transfer material to remain on the film and the paper to be stripped therefrom. If desired the perforations may be registered by means of projections 12 carried by support 13.

One embodiment is a photographic stripping film of known type in which the transfer layer is of gelatine or collodion and carries a photographically formed image. These are well known in the art, typical examples being disclosed for use in motion picture color processes in the British patent to Kent 20,566 of 1912.

The transfer layer may be of the type commonly used for decalcomania.

Still another method that is particularly useful is by dye transfer from a dye absorbent layer such as a gelatine relief image carried by a strip of the motion picture film type. This method of transfer is well known in color photography. I purpose supplying a "stencil" or master member having the desired design and capable of repeated use. One advantage of this form is that different colors or tints may readily be used, and this form is particularly useful where complete opacity is not desired.

The applied layer may also be of ink, pigment, or dye applied by a printing roller of types well known in the printing art.

In Fig. 10 such a roller 20 is shown on a pad 21, from which it may be drawn by handle 25 across the film F lying on a support 22. The roller will be of such size that the design to be applied may be formed around its periphery. The roller may have a rubber periphery for transferring by the offset process an ink impression from inked designs on the pad; or it may have relief or intaglio images that are inked or dyed by the pad.

I consider as included in my invention all other modifications and equivalents as may fall within the scope of the appended claims.

Having thus described my invention, what I claim as new and desire to secure by Letters Patent is,—

1. A motion picture film bearing two consecutive series of image containing areas, the density of the images of each one of said series being substantially uniform, and an applied light retarding layer overlying the junction of said two series and a continuous portion of each of said series adjacent the junction, said layer varying in the total light transmission of areas corresponding to the image areas, and in the vicinity of said junction being opaque over its full width.

2. A motion picture film having thereon two consecutive series of areas containing photographic images, the density of said images of each of said series being substantially uniform and a mechanically applied layer overlying a portion of each of said series next their junction point, said layer varying in its total light transmission along its length.

3. A motion picture film having thereon two consecutive series of areas containing photographic images, the density of said images of each of said series being substantially uniform, and a mechanically applied layer overlying a portion of each of said series next their junction point, said layer varying in its total light transmission along its length, and being substantially opaque in the vicinity of said junction point and increasing in its light transmission gradually in both directions from said vicinity.

4. A motion picture film having thereon two consecutive series of picture areas containing photographic images, the density of the images of each of said series being substantially uniform and a mechanically applied light retarding layer overlying a portion of each of said series next their junction point, said layer having opposite successive picture areas light transmitting spaces the size of said spaces varying from area to area.

5. A motion picture film having thereon two consecutive series of picture areas containing photographic images, the density of the images of each of said series being substantially uniform and a mechanically applied light retarding layer overlying a portion of each of said series next their junction point, said layer having opposite successive picture areas light transmitting spaces the size of said spaces varying from area to area, and being greatest at the ends of the applied layer.

6. A photographic film strip having thereon two aligned longitudinally extending photographic records and an applied light retarding layer overlying a continuous portion of at least one of said records adjacent its junction with the next record, said layer varying longitudinally in its light transmission and having its greatest retarding effect at the junction point where it is substantially opaque.

7. A photographic film strip carrying two aligned longitudinally extending photographic records and an applied light retarding layer overlying the junction of said records and a portion of each record adjacent said junction, said layer having its greatest light retarding effect at the junction point and gradually diminishing in both directions away from said point.

Signed at Rochester, New York this 25th day of February, 1928.

PAUL FAVOUR.